United States Patent [19]

Burnsweig et al.

[11] 3,889,212

[45] June 10, 1975

[54] CIRCULATIVE SURFACE ACOUSTIC WAVE DEVICE

[75] Inventors: Joseph Burnsweig; Steven H. Arneson, both of Los Angeles, Calif.

[73] Assignee: Hughes Aircraft Company, Culver City, Calif.

[22] Filed: May 13, 1974

[21] Appl. No.: 470,110

[52] U.S. Cl. .................... 333/30 R; 310/9.8; 333/72

[51] Int. Cl. ....... H03h 9/30; H03h 9/26; H03h 9/32

[58] Field of Search ......... 333/30 R, 72; 310/8, 8.1, 310/8.2, 8.3, 9.1, 9.7, 9.8

[56] References Cited

UNITED STATES PATENTS

| | | | |
|---|---|---|---|
| 3,745,486 | 7/1973 | Chiron et al. | 333/30 R |
| 3,815,056 | 6/1974 | Meyer et al. | 333/30 R |
| 3,831,116 | 8/1974 | Davis, Jr. et al. | 333/72 |

*Primary Examiner*—James W. Lawrence
*Assistant Examiner*—Marvin Nussbaum
*Attorney, Agent, or Firm*—W. H. MacAllister, Jr.; John Holtrichter, Jr.

[57] ABSTRACT

An acoustic surface wave device preferably functioning as a circulative delay line with applications such as in radar pulse compression/expansion systems, spread spectrum systems and data link transmission systems, the device including an elongated slab of quartz, for example, having two parallel planar surfaces, there being an electroacoustic transducer disposed on each of the surfaces, the transducers being oriented to direct surface acoustic wave energy from one of the transducers to the other transducer around a curved end portion of the slab, the device including an elongated gap in the slab between the planar surfaces and extending at least between the transducers for providing electrical and mechanical coupling isolation therebetween.

10 Claims, 5 Drawing Figures

CIRCULATIVE SURFACE ACOUSTIC WAVE DEVICE

The invention herein described was made in the course of or under a contract with the United States Navy.

BACKGROUND OF THE INVENTION

The background of the invention will be set forth in two parts.

1. Field of the Invention

This invention relates to surface acoustic wave devices and more particularly to circulative configurations of such devices.

2. Description of the Prior Art

Surface acoustic waves propagate along the boundary surfaces of solids. The phenomenon was first described by Lord Rayleigh in an article entitled "On Waves Propagated Along the Plane Surface of an Elastic Solid," *Proceedings*, London Mathematic Society, Vol. 17, pages 4–11, November 1885. Devices utilizing such surface waves have the advantage of allowing for easy access at all times to the propagating acoustic energy, to sample it, and to modify and interact with it.

In contrast to well-known bulk waves, surface waves are localized at the surface of the elastic solids, the typical particle motion being elliptical retrograde and the amplitude decaying exponentially into the body of the medium. As to a comparison of phase velocities, the speed of a surface wave is approximately 90–95% that of the bulk shear wave in most media. Probably the most widely used media for the propagation of surface acoustic waves at the present time are lithium niobate and quartz, both piezoelectric materials.

The basic building block of all surface wave devices is the surface acoustic wave delay line which includes spaced transducers disposed on a surface wave supporting medium. The transducers provide the necessary transition from normal electrical circuitry into the acoustic domain. In the more common case where the medium has piezoelectric properties, the most used transducers are of the interdigital type consisting of acoustic electrodes that form interleaved finger patterns which convert electrical signals into surface acoustic waves in the medium and also convert such wave energy incident thereon into corresponding electrical signals.

In many important applications, surface acoustic wave devices exhibiting relatively long delays are required. In the past such devices have been designed with input and output transducers on the same extremely long substrate surface, which is not readily fabricated. On the other hand, some work has been done in the area of recirculating or canted delay lines where opposite elongated planar surfaces of a piezoelectric material are utilized. However, these devices have exhibited problems with internal leakage.

External isolation has been attempted, including unique electrical balancing circuits for push-pull input/output configurations to attempt to remove the unwanted signals. Although partially effective, the remedy does not remove multiple reflective signals that have been generated. This is not as true on low piezoelectric coupling substrates such as quartz, for example, but is a considerable problem with materials having higher order coupling factors such as lithium niobate and bismuth germanium oxide. This is an important factor in that although electro-acoustic transducers primarily generate Rayleigh waves, they also propagate longitudinal and degenerate shear modes.

The prior art also includes circulative configurations using synchronous tuned, short interdigital transducers. The designers of these devices have not been primarily concerned with direct feedthrough since the geometry can be adjusted to minimize the capacity, however, the basic distortion due to reflections within the bulk region and direct feedthrough is present.

SUMMARY OF THE INVENTION

In view of the foregoing factors and conditions characteristic of the prior art, it is a primary object of the present invention to provide an improved surface acoustic wave device having a circulative configuration.

Another object of the present invention is to provide a relatively compact circulative surface acoustic wave device having a relatively long time delay with low leakage and distortion.

Still another object of the present invention is to provide a circulative surface acoustic wave device having an exceptionally long time delay bandwidth product with sufficient isolation of the input signal to insure practical signal processing applications, in addition to minimal distortion.

Yet another object of the present invention is to provide a circulative surface acoustic wave delay line with conjugate slope lines and cascaded interdigital transducers for reliable operation in a nonsensitive thermal environment.

In accordance with an embodiment of the present invention, a circulative surface acoustic wave device includes an elongated substrate of piezoelectric material capable of supporting the propagation of surface acoustic wave energy, the substrate having two generally parallel planar surfaces along the length thereof, and having a curved end surface portion capable of supporting the propagation of surface acoustic wave energy from one of the planar surfaces to the other. At least one electro-acoustic transducer is disposed on each of the planar surfaces, the transducers being oriented to direct the surface acoustic wave energy along the planar surfaces from one to the other around the curved end portion of the substrate. The device also includes a gap in the material extending at least between the transducers, for providing electrical and mechanical isolation therebetween.

A metallic septum may be disposed in the gap and/or an acoustic energy absorbing material may be disposed in the gap along the side walls thereof.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawings, in which like reference characters refer to like elements of the several views.

DESCRIPTION OF THE PREFERRED EMBODIMENTS

Figures 1, 2, 3, 4, 5:
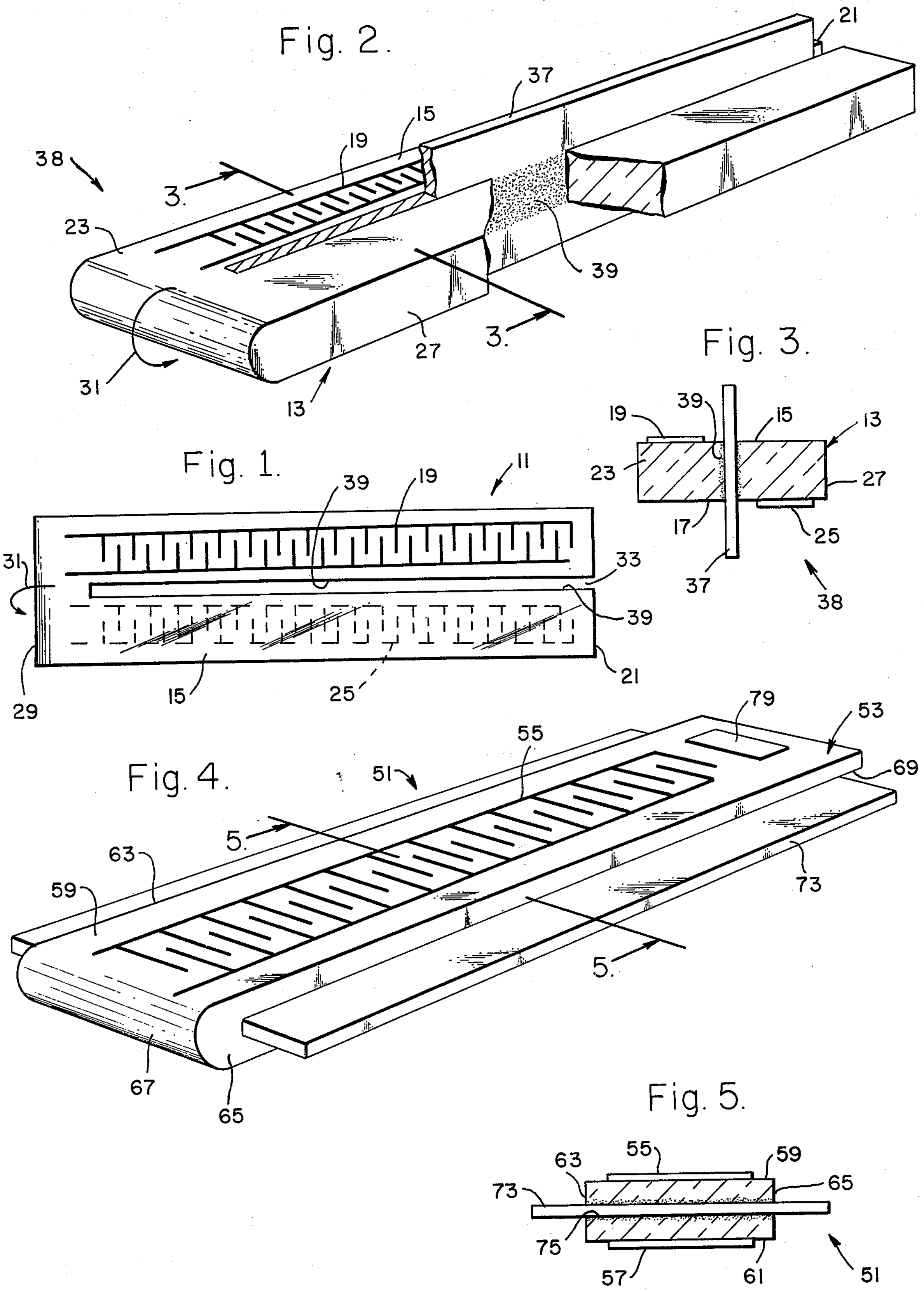
FIG. 1 is a plan view of a circulative surface acoustic wave device constructed in accordance with one embodiment of the present invention.
FIG. 2 is a perspective view of a circulative surface acoustic wave device in accordance with another embodiment of the invention.
FIG. 3 is a sectional representation of the device of FIG. 2.
FIG. 4 is a perspective view of still another embodiment of the present invention.
FIG. 5 is a sectional representation of the embodiment illustrated in FIG. 4.

Referring now to the drawing and more particularly to FIG. 1, there is shown a circulative surface acoustic wave device in the form of a canted dispersive delay line 11 including an elongated substrate 13 of material capable of supporting the propagation of surface and bulk acoustic wave energy, the substrate having two generally parallel planar surfaces 15 and 17 along its length.

A first electro-acoustic transducer 19 is shown disposed on the upper planar surface 15 adjacent the first end 21 and a first side 23 of the substrate 13, and a second transducer 25 is shown disposed on the lower planar surface 17, also adjacent the end 21 but adjacent a second side 27. The transducers may be any conventional type capable of providing the required characteristics for the substrate material used.

The transducers are oriented to direct and receive surface acoustic wave energy propagating between the transducers and around a curved second end 29 of the substrate, as indicated by arrow 31. In this embodiment, the transducers are canted in a conventional manner to provide the desired orientation, and the curved end 29, capable of supporting the propagation of surface acoustic wave energy from one planar surface to the other, is well known in the art.

In accordance with the embodiment 11 of the invention illustrated in FIG. 1, the substrate 13 is cut or otherwise provided with an elongated gap 33 extending from the first end 21 to a point adjacent, but not to, the second end 29. The gap 33 lies in a plane perpendicular to the substrate surfaces 15 and 17 between the transducers 19 and 25. The gap configuration alone provides an advantageous degree of attenuation of both electrical and mechanical coupling between the transducers.

An even greater degree of intertransducer isolation may be provided, however, by the mounting of a metallic septum 37 in the gap 33, the septum at least extending between the transducers, and preferably extending the length of the gap and beyond the planar surfaces 15 and 17. This is illustrated in FIGS. 2 and 3 as embodiment 38. Alternately, one or both of the walls of the gap 33 may be coated with a conventional acoustic energy absorbing material 39 to provide additional mechanical isolation, as seen in FIG. 1.

In accordance with a presently preferred embodiment of the invention, both the septum 37 and the absorbing material 39 are disposed in the gap 33 to provide a relatively high degree of electrical and mechanical intertransducer isolation. In the case of electrical isolation, the above-described isolation means reduces the feedthrough capacity between the transducers, and isolate bulk and spurious waves generated by the input transducer, in addition to the desired surface waves generated, due to electrical transduction. As to mechanical isolation characteristics of the invention, the isolation techniques provide physical separation of the propagating sound waves or vibrations produced by the interdigital input/output transducers, with resulting isolation and absorption of spurious reflections. Additionally, there is provided an alteration of mechanical impedance through loading with resultant changes in sound propagating characteristics through the substrate.

With reference to FIGS. 4 and 5, an embodiment 51 is shown having a substrate 53 similar to substrate 13 but with upper and lower electro-acoustic transducers 55 and 57 disposed generally centrally on upper and lower elongated planar surfaces 59 and 61, between its sides 63 and 65. Like the transducers in the first embodiment, the transducers shown in FIG. 3 may be either dispersive or non-dispersive and are adapted to cause the propagation of surface acoustic wave energy at least from one (input) of the transducers to the other (output) around a curved end 67 of the substrate.

Isolation is provided by means of an elongated slot 69 cut or otherwise fabricated in the substrate 53 in a plane generally parallel to the substrate planar surfaces, between the transducers. Additional isolation may be provided by mounting a metallic septum 73 and/or a coating 75 of conventional acoustic energy absorbing material, as was set forth in the previously described embodiment of the invention. Further, such absorbent material may be disposed on the planar surfaces between the transducers 55 and 57 and an adjacent end 77, as indicated by reference numeral 79, in order to reduce end reflections, in accordance with well-known techniques.

From the foregoing, it should be evident that there has herein been described novel and advantageous surface acoustic wave designs which may make use of interdigital apodization (frequency-amplitude weighting) and transversal equalization (time-amplitude weighting) on circulative, low leakage, long time delay lines. The new techniques utilize conjugate slope lines with cascaded interdigital transducers for providing stable, reliable operation in a nonsensitive thermal environment, the circulative configuration allowing efficient use of both sides of the substrate, in addition to allowing a relatively monolithic and ruggedized shock resistant package to be produced. In accordance with the invention, a unique geometry is employed to allow for electrical or mechanical isolation of the input and output transducers to insure that direct feedthrough leakage and bulk wave distortion is minimized or eliminated.

It should be understood that the materials and processes used to fabricate the various embodiments of the invention are not critical and any material and process exhibiting and providing similar desired characteristics may be substituted for those specifically mentioned. It should also be understood that the invention is susceptible to modifications including, but not limited to a circulative configuration in which the surface acoustic wave energy makes more than one 180° reversal in direction (around more than one curved end portion).

What is claimed is:

1. A circulative surface acoustic wave device, comprising:

an elongated substrate of material capable of supporting the propagation of surface acoustic wave energy, said substrate having two generally planar surfaces along the length thereof, and also having at least one curved end surface portion capable of supporting the propagation of said acoustic energy from one of said surfaces to the other;

at least one electro-acoustic transducer disposed on each of said planar surfaces, said transducers being oriented to direct and receive said surface acoustic wave energy along said planar surfaces from one to the other around said curved end surface portion of said substrate;

isolation means including a gap in said material extending at least between said transducers for attenuating both electrical and mechanical coupling between said transducers.

2. The circulative surface acoustic wave device according to claim 1, wherein said gap extends from one end of said substrate toward but not to said curved end surface portion thereof.

3. The circulative surface acoustic wave device according to claim 1, wherein said isolation means also includes a septum disposed in said gap and extending at least between said transducers.

4. The circulative surface acoustic wave device according to claim 3, wherein said septum is a metal plate.

5. The circulative surface acoustic wave device according to claim 1, wherein said isolation means also includes acoustic wave absorbing material disposed in said gap essentially along the entire length and width thereof.

6. The circulative surface acoustic wave device according to claim 1, wherein said isolation means also includes a metallic septum disposed in said gap and extending at least between said transducers, and further including acoustic wave absorbing material disposed along at least one of the side walls of said gap.

7. The circulative surface acoustic wave device according to claim 1, wherein said gap in said substrate extends in a plane perpendicular to the plane of said planar surfaces.

8. The circulative surface acoustic wave device according to claim 1, wherein said gap in said substrate extends in a plane parallel to the plane of said planar surfaces.

9. The circulative surface acoustic wave device according to claim 1, wherein said substrate material is piezoelectric.

10. The circulative surface acoustic wave device according to claim 9, wherein said substrate is a single slab of quartz.

* * * * *